United States Patent
Zhu et al.

(10) Patent No.: US 11,956,647 B2
(45) Date of Patent: Apr. 9, 2024

(54) BROADCAST BEAM PROCESSING METHOD AND COMMUNICATIONS APPARATUS

(71) Applicant: HUAWEI TECHNOLOGIES CO., LTD., Guangdong (CN)

(72) Inventors: Chengzhi Zhu, Shanghai (CN); Hui Gao, Shanghai (CN); Yifeng Wang, Shanghai (CN); Tianyu Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 17/387,288

(22) Filed: Jul. 28, 2021

(65) Prior Publication Data

US 2021/0360437 A1 Nov. 18, 2021

Related U.S. Application Data

(63) Continuation of application No. PCT/CN2020/073001, filed on Jan. 19, 2020.

(30) Foreign Application Priority Data

Jan. 28, 2019 (CN) .......................... 201910080376.0

(51) Int. Cl.
*H04W 16/28* (2009.01)
*H04W 24/02* (2009.01)
*H04W 24/10* (2009.01)

(52) U.S. Cl.
CPC .......... *H04W 16/28* (2013.01); *H04W 24/02* (2013.01); *H04W 24/10* (2013.01)

(58) Field of Classification Search
None
See application file for complete search history.

(56) References Cited

U.S. PATENT DOCUMENTS

2013/0121185 A1   5/2013   Li et al.
2013/0155847 A1*  6/2013   Li ......................... H04W 24/04
                                                                370/225

(Continued)

FOREIGN PATENT DOCUMENTS

CN   101505182 A   8/2009
CN   101605336 A   12/2009

(Continued)

OTHER PUBLICATIONS

Office Action in Chinese Application No. 201910080376.0, dated Apr. 6, 2021, 14 pages.

(Continued)

*Primary Examiner* — Eunsook Choi
(74) *Attorney, Agent, or Firm* — Fish & Richardson P.C.

(57) ABSTRACT

The present disclosure discloses example broadcast beam processing methods and apparatuses. One example method includes sending a first broadcast beam. A first measurement report is received from a first terminal after the first broadcast beam is sent, and a weak coverage area of the first broadcast beam is determined based on the first measurement report. A second broadcast beam is then sent, where the second broadcast beam is used to cover the weak coverage area of the first broadcast beam.

8 Claims, 7 Drawing Sheets

(56) References Cited

U.S. PATENT DOCUMENTS

| | | | |
|---|---|---|---|
| 2016/0165458 A1* | 6/2016 | Peng | H04W 16/32 |
| | | | 370/329 |
| 2018/0184387 A1 | 6/2018 | Rasmus et al. | |
| 2019/0261378 A1* | 8/2019 | Chendamarai Kannan | |
| | | | H04L 1/1812 |
| 2020/0053607 A1* | 2/2020 | Ingale | H04W 36/0058 |
| 2020/0059807 A1* | 2/2020 | Fan | H04W 24/10 |
| 2020/0067590 A1* | 2/2020 | Wang | H04W 52/365 |

FOREIGN PATENT DOCUMENTS

| | | |
|---|---|---|
| CN | 101651481 A | 2/2010 |
| CN | 102202330 A | 9/2011 |
| CN | 102316470 A | 1/2012 |
| CN | 103826233 A | 5/2014 |
| CN | 106160817 A | 11/2016 |
| CN | 106412973 A | 2/2017 |
| CN | 107105439 A | 8/2017 |
| CN | 107889121 A | 4/2018 |
| WO | 2016061737 A1 | 4/2016 |

OTHER PUBLICATIONS

Office Action in Chinese Application No. 201910080376.0, dated Jun. 16, 2021, 18 pages.
PCT International Search Report and Written Opinion in International Application No. PCT/CN2020/073001, dated Apr. 17, 2020, 13 pages.
Extended European Search Report issued in European Application No. 20748472.6 dated Feb. 10, 2022, 9 pages.

* cited by examiner

BROADCAST BEAM PROCESSING METHOD AND COMMUNICATIONS APPARATUS

CROSS-REFERENCE TO RELATED APPLICATIONS

This application is a continuation of International Application No. PCT/CN2020/073001, filed on Jan. 19, 2020, which claims priority to Chinese Patent Application No. 201910080376.0, filed on Jan. 28, 2019. The disclosures of the aforementioned applications are hereby incorporated by reference in their entireties.

TECHNICAL FIELD

This application relates to the field of wireless communications technologies, and specifically, to a broadcast beam processing method and a communications apparatus.

BACKGROUND

With rapid development of wireless communications technologies, emergence of various communication services leads to an increasing demand for spectrum resources. In an environment in which a capacity of spectrum resources is gradually saturated, increasing a spectrum utilization rate becomes a major development trend. A massive multiple-input multiple-output (massive multiple-input multiple-output, MM) antenna technology is a technology that can effectively increase a spectrum utilization rate.

With the arrival of a 5th generation mobile communication technology (the 5th generation mobile communication technology, 5G) era, a broadcast channel is covered in a scanning manner by using narrow beams formed by beamforming (beam forming, BF). In a 5G technology, an MM antenna has a larger quantity of digital channels, so that more beams can be formed, thereby providing a larger coverage scope. However, a quantity of broadcast beams is limited. For example, in a new radio (new radio, NR) protocol, a quantity of broadcast beams for 5G communication is limited to a maximum of 8. Because the beams are narrow and a quantity of beams is small, a coverage scope of the broadcast channel cannot be consistent with a coverage scope of a data channel. If all broadcast beams scan on a vertical plane, coverage of the broadcast channel on a horizontal plane is poor. If all broadcast beams scan on a horizontal plane, coverage of the broadcast channel on a vertical plane is poor. When the coverage scope of the broadcast channel is smaller than the coverage scope of the data channel, a signal received by a terminal in a weak coverage area that is not covered by the broadcast channel has relatively weak strength. As a result, an actual data transmission capability of the terminal is incorrectly determined, and the terminal cannot access a network.

Therefore, how to send a broadcast beam to improve the coverage scope of the broadcast channel becomes a problem that needs to be urgently resolved.

SUMMARY

Embodiments of this application provide a broadcast beam processing method. A first broadcast beam may be sent to cover a target cell, a weak coverage area of the first broadcast beam in the target cell is determined based on a measurement report reported by a terminal in the target cell, and then a second broadcast beam is sent to cover the weak coverage area, thereby improving broadcast channel quality in the weak coverage area and increasing a user access proportion of the target cell. The embodiments of this application further provide a corresponding communications apparatus.

To achieve the foregoing objective, the embodiments of this application provide the following technical solutions.

According to a first aspect of this application, a broadcast beam processing method is provided. The method includes: sending a first broadcast beam; receiving a first measurement report from a first terminal; determining a weak coverage area of the first broadcast beam based on the first measurement report; and sending a second broadcast beam, where the second broadcast beam is used to cover the weak coverage area of the first broadcast beam. The first broadcast beam may be used to cover a target cell, and may be obtained through broadening. For example, the target cell covered by the first broadcast beam is originally covered by N broadcast beams, and N is a positive integer greater than a quantity of first broadcast beams. After broadening, a coverage scope of the first broadcast beam may be equivalent to a coverage scope of the original N broadcast beams. The weak coverage area of the first broadcast beam may be determined based on the first measurement report received from the first terminal in the coverage scope of the first broadcast beam. Sending the second broadcast beam to cover the weak coverage area of the first broadcast beam may improve broadcast channel quality in these areas and increase a user access proportion of the target cell.

It can be learned from the first aspect that, by sending the first broadcast beam to cover the target cell, the first measurement report may be received from the first terminal in the target cell, and the weak coverage area of the first broadcast beam in the target cell may be determined based on the first measurement report. The second broadcast beam is sent to cover the weak coverage area, thereby improving the broadcast channel quality in the weak coverage area of the first broadcast beam, increasing a user access proportion, increasing a traffic volume of the target cell, and promoting service development.

Optionally, with reference to the first aspect, in a first possible implementation, the first measurement report of the first terminal includes broadcast channel quality information, and broadcast channel quality indicated by the broadcast channel quality information is less than a first threshold, where the first threshold may be a fixed preset value, or may be a value determined after being sorted based on the broadcast channel quality; and the weak coverage area of the first broadcast beam includes a location of the first terminal.

It can be learned from the first possible implementation of the first aspect that, the broadcast channel quality at the location of the first terminal corresponding to the first measurement report can be quickly and accurately determined by using the broadcast channel quality information in the first measurement report. When the broadcast channel quality indicated by the broadcast channel quality information is less than the first threshold, it may be considered that the location of the first terminal is in the weak coverage area of the first broadcast beam.

Optionally, with reference to the first possible implementation of the first aspect, in a second possible implementation, the first measurement report of the first terminal further includes data channel quality information, and data channel quality indicated by the data channel quality information is greater than a second threshold. Similar to the first threshold, the second threshold may be a fixed preset value, or may be a value determined after being sorted based on the data channel quality.

It can be learned from the second possible implementation of the first aspect that, the data channel quality at the location of the first terminal may be further determined by using the broadcast channel quality information in the first measurement report, and the data channel quality may be used as a condition for further filtering for the weak coverage area. When the data channel quality indicated by the data channel quality information is greater than the second threshold, it may be considered that the data channel quality at the location of the first terminal is good. Therefore, sending the second broadcast beam to cover the first terminal has greater practical value, because when data channel quality in an area is poor, sending more broadcast beams to improve broadcast channel quality cannot effectively increase a traffic volume in the area, but causes a waste of broadcast beam resources.

Optionally, with reference to the first aspect, or the first or the second possible implementation of the first aspect, in a third possible implementation, the first terminal includes at least one first terminal, the first measurement report includes at least one first measurement report, and the at least one first terminal is in a one-to-one correspondence with the at least one first measurement report. The determining a weak coverage area of the first broadcast beam based on the first measurement report includes: determining I weak coverage areas of the first broadcast beam based on the at least one first measurement report, where the I weak coverage areas do not overlap each other, the I weak coverage areas are $C_i$, i is an integer ranging from 0 to I−1, and the I weak coverage areas include a location of the at least one first terminal.

It can be learned from the third possible implementation of the first aspect that, there may be one or more first terminals and one or more first measurement reports, and the first terminals are in a one-to-one correspondence with the first measurement reports. The weak coverage areas of the first broadcast beam that are determined based on these first measurement reports are the I areas that do not overlap each other, and locations of these first terminals are in the I weak coverage areas.

Optionally, with reference to the third possible implementation of the first aspect, in a fourth possible implementation, a step of sending the second broadcast beam includes: sending, within a time period $t_i$, the second broadcast beam to cover $C_i$. The broadcast beam processing method further includes: obtaining a terminal increase amount in $C_i$, where the terminal increase amount in $C_i$ includes a difference between a terminal access amount of the second broadcast beam in $C_i$ and a terminal access amount of the first broadcast beam in $C_i$; or the terminal increase amount in $C_i$ includes a difference between a terminal access amount of the second broadcast beam whose broadcast channel quality in $C_i$ is greater than a third threshold and a terminal access amount of the first broadcast beam whose broadcast channel quality in $C_i$ is greater than the third threshold; and the third threshold is a fixed criterion used to determine whether the broadcast channel quality meets a condition; and when the terminal increase amount in $C_i$ is greater than a fourth threshold, sending the second broadcast beam in a time period T to cover $C_i$, where a length of the time period T is greater than a length of the time period $t_i$ and the fourth threshold may be a preset value or may be a value selected after all terminal increase amounts in $C_i$ are sorted. The terminal increase amounts in $C_i$ including different types of increase amounts add diversity to the solutions.

According to a second aspect of this application, a communications apparatus is provided. The communications apparatus is configured to perform the broadcast beam processing method according to any one of the first aspect or the possible implementations of the first aspect. Specifically, the communications apparatus may include a module configured to perform the broadcast beam processing method according to any one of the first aspect or the possible implementations of the first aspect.

According to a third aspect of this application, a communications apparatus is provided. The communications apparatus includes a processor, the processor is coupled to a memory, the memory is configured to store instructions, and the processor is configured to execute the instructions stored in the memory, so that the processor performs the broadcast beam processing method according to any one of the first aspect or the possible implementations of the first aspect. Optionally, the communications apparatus further includes the memory.

According to a fourth aspect of this application, a computer-readable storage medium is provided. The computer-readable storage medium stores instructions; and when the instructions are run on a computer, the computer is enabled to perform the broadcast beam processing method according to any one of the first aspect or the possible implementations of the first aspect.

It can be learned from the foregoing technical solutions that, in the solutions, the first broadcast beam is sent to cover the target cell, the weak coverage area covered by the first broadcast beam in the target cell is determined by using the measurement report of the first terminal in the target cell, and then the second broadcast beam may be sent to cover the weak coverage area, so that the broadcast channel quality in the weak coverage area is improved and a problem that a user cannot access a network in the weak coverage area is resolved, thereby effectively increasing the traffic volume of the target cell and promoting development of a communication service.

DESCRIPTION OF EMBODIMENTS

The following describes the embodiments of this application with reference to the accompanying drawings. It is clear that the described embodiments are merely some but not all of the embodiments of this application. A person of ordinary skill in the art may know that with evolution of a graph computing framework and emergence of a new application scenario, the technical solutions provided in the embodiments of this application are also applicable to similar technical problems.

Figure 1:
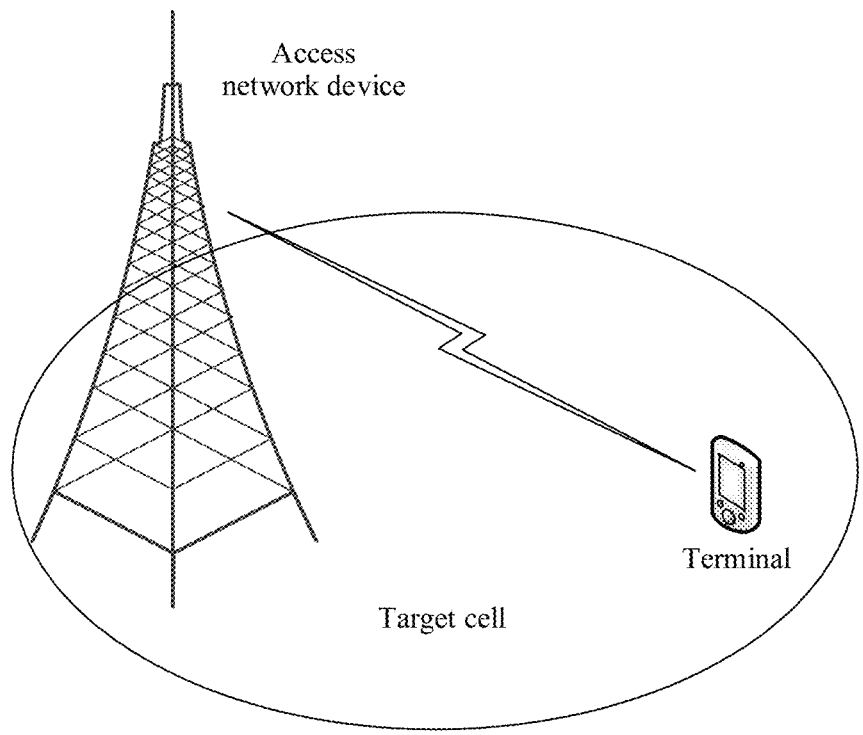
FIG. 1 is a schematic diagram of an embodiment of a communications system according to an embodiment of this application.

The technical solutions in the embodiments of this application may be applied to a 5G communications architecture or a communications architecture after 5G. FIG. 1 is a schematic diagram of an application scenario according to an embodiment of this application. The application scenario includes an access network device and a terminal. A plurality of broadcast beams sent by the access network device are used to cover a target cell and establish a broadcast channel. The terminal is located in the target cell covered by the access network device, and may communicate with the access network device by using the broadcast channel.

The access network device in the embodiments of this application may also be referred to as a radio access network (radio access network, RAN) device. The RAN device is connected to the terminal, and is configured to receive data from the terminal and send the data to a core network device. The RAN device corresponds to different devices in different communications systems. For example, the RAN device corresponds to a base station and a base station controller in a second generation mobile communication technology (the 2nd generation mobile communication technology, 2G) system, the RAN device corresponds to a base station and a radio network controller (radio network controller, RNC) in a third generation mobile communication technology (the 3rd generation mobile communication technology, 3G), the RAN device corresponds to an evolved NodeB (evolved NodeB, eNB) in a 4G system, and the RAN device corresponds to an access network device (for example, a gNB, a CU, or an IU) in a 5G system, for example, in a new radio access system (new radio access technology, NR).

The terminal in this embodiment of this application may be a device that includes a wireless transceiver function and can cooperate with the access network device to provide a communication service for a user. Specifically, the terminal may be user equipment (user equipment, UE), an access terminal, a subscriber unit, a subscriber station, a mobile station, a mobile console, a remote station, a remote terminal, a mobile device, a user terminal, a terminal, radio communications equipment, a user agent, or a user apparatus. For example, the terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, or a terminal in a 5G network or a post-5G network. This is not limited in this embodiment of this application.

In a 5G communications architecture, a broadcast channel is sent in a scanning manner by using a plurality of narrow beams formed by beamforming. An MM antenna in 5G has a larger quantity of digital channels, so that more beams can be formed on a vertical plane, thereby providing a larger coverage scope. However, in an NR protocol, a quantity of broadcast beams in 5G is limited to a maximum quantity of 8. Because the beams are narrow and a quantity of beams is small, the broadcast beams cannot effectively cover some areas, and broadcast channel quality in a weak coverage area that cannot be effectively covered by the broadcast beams is poor. Consequently, a user cannot access a network.

This embodiment of this application provides a solution, to resolve a problem that the user cannot access the network due to the poor broadcast channel quality in the weak coverage area of the target cell, improve the broadcast channel quality in the weak coverage area, and increase a user access proportion in the target cell, thereby increasing a traffic volume of the target cell and promoting service development. In this solution, a first broadcast beam may be sent to cover the target cell, and a second broadcast beam is sent to cover the weak coverage area of the first broadcast beam in the target cell, thereby improving the broadcast channel quality in the weak coverage area, resolving the problem that the user in the weak coverage area cannot access the network, and increasing the user access proportion. The following separately provides detailed descriptions.

Figure 2A:
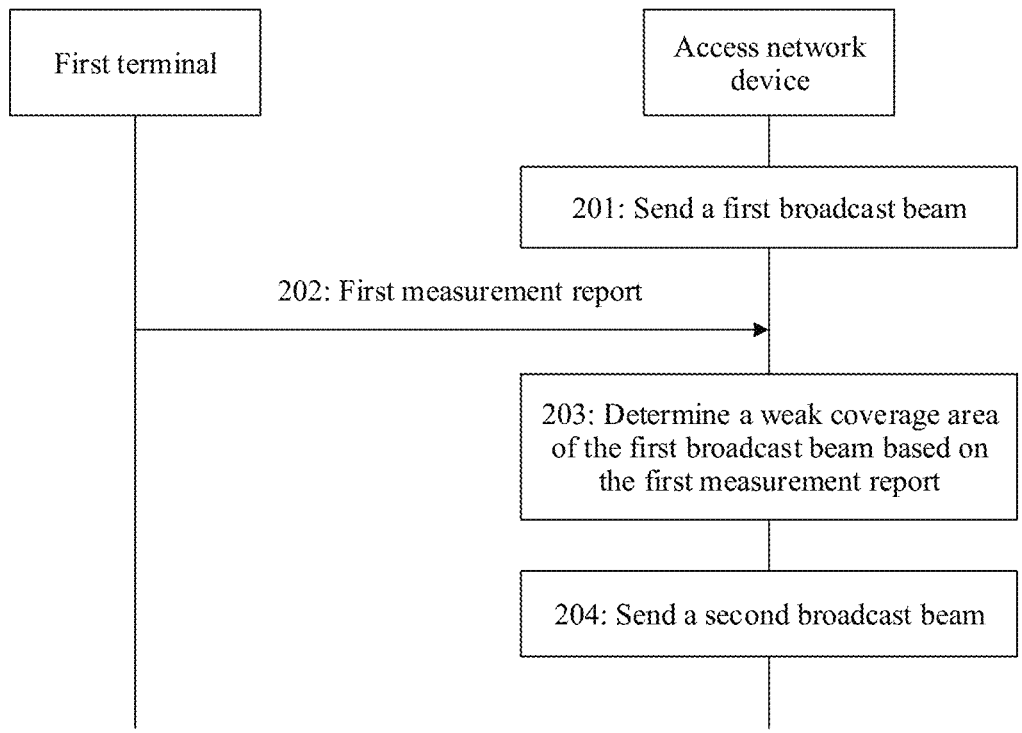
FIG. 2A is a schematic diagram of an embodiment of a broadcast beam processing method according to an embodiment of this application.

FIG. 2A is a schematic diagram of an embodiment of a broadcast beam processing method according to an embodiment of this application.

As shown in FIG. 2A, the embodiment of the broadcast beam processing method according to this embodiment of this application may include the following steps.

201: An access network device sends a first broadcast beam.

In this embodiment, there is at least one first broadcast beam. For ease of description, a quantity of first broadcast beams is set to A. The access network device covers a cell by sending the A first broadcast beams. The cell may be referred to as a target cell. The A first broadcast beams may provide a broadcast channel used to communicate with a terminal in the target cell, and A is an integer greater than or equal to 1.

Optionally, when a maximum quantity of broadcast beams sent by the access network device is N, and N is an integer greater than A, the A first broadcast beams are obtained through broadening, and broadening refers to extending processing on a width of a beam. Compared with each original broadcast beam, each first broadcast beam obtained through broadening has a larger width. Therefore, a coverage scope of each first broadcast beam is larger, so that coverage of the original N broadcast beams is replaced with coverage of the A first broadcast beams. After the access network device sends the A first broadcast beams, a remaining quantity of broadcast beams that can be sent by the access network device is N-A, and the remaining quantity of broadcast beams may be used to send a second broadcast beam, to cover a weak coverage area of the A first broadcast beams.

Figure 2B:
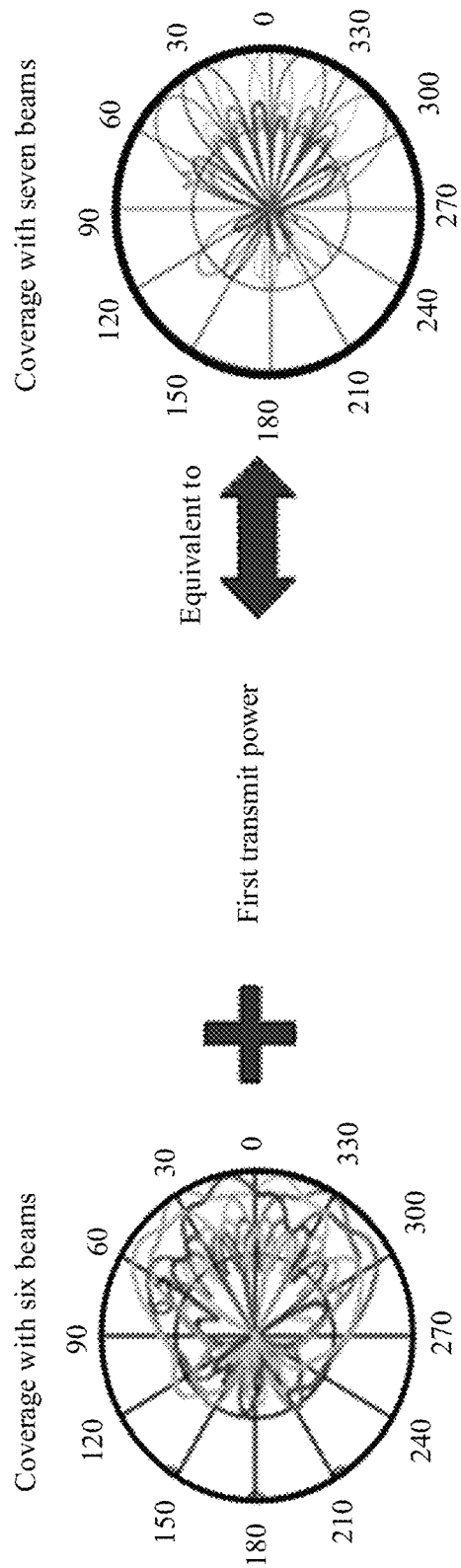
FIG. 2B is a schematic diagram of first broadcast beam coverage according to an embodiment of this application.

For ease of understanding, an example in which the maximum quantity of broadcast beams sent by the access network device is 7 is used for description. As shown in FIG. 2B, in an original broadcast beam coverage solution, the access network device sends seven broadcast beams to cover one target cell. In this technical solution, an original broadcast beam coverage scope may be expanded through beam broadening, so that six first broadcast beams can form a coverage scope that is equivalent to that of the original seven broadcast beams. A remaining beam that can be sent may be used to cover a weak coverage area of the first broadcast beams in the target cell, thereby increasing a user access proportion. However, a maximum gain of a beam may be reduced through beam broadening. In other words, a maximum gain of the six first broadcast beams is less than that of the original seven broadcast beams. Therefore, a transmit power of the access network device further needs to be adjusted. The transmit power used by the access network device to send the six first broadcast beams is increased in a power aggregation manner, to compensate for a beam gain loss. An increased transmit power is a first transmit power. In this way, coverage performance is not affected while the coverage scope remains unchanged. A power aggregation manner is not limited in this embodiment of this application.

It should be noted that maximum quantities of broadcast beams sent by different access network devices are different. However, in an existing NR protocol, it is specified that a maximum quantity of broadcast beams is 8. Therefore, the maximum quantity of broadcast beams sent by an existing access network device is usually equal to or less than 8, and it is most common that the maximum quantity of broadcast beams sent by the access network device is 7. This is not specifically limited herein.

It should be understood that the quantity A of the first broadcast beams may also be adjusted based on an actual situation. Considering that beam broadening amplitude cannot be excessively large, the quantity A of the first broadcast beams cannot be excessively small. Otherwise, the coverage performance cannot be ensured. This is not specifically limited herein.

202: The access network device receives a first measurement report from a first terminal.

In this embodiment, the first terminal is at least one terminal in the target cell, and the first measurement report is at least one first measurement report that is in a one-to-one correspondence with the first terminal. It should be understood that there are a plurality of terminals in the target cell covered by the access network device, and the first terminal is a part of terminals, in the plurality of terminals in the target cell, whose broadcast channel quality does not meet a condition. The access network device may receive, through intra-site message exchange, measurement reports reported by the plurality of terminals in the target cell. Because there are a plurality of terminals in the target cell, there are also a plurality of measurement reports. The intra-site message exchange means that message exchange is performed by using a same access network device.

For ease of understanding, the following example may be used. The target cell includes a terminal A, a terminal B, a terminal C, and a terminal I. The access network device may receive, from the terminal A, the terminal B, the terminal C, and the terminal I, a measurement report A, a measurement report B, a measurement report C, and a measurement report I respectively corresponding to the terminal A, the terminal B, the terminal C, and the terminal I. These measurement reports may be used to determine broadcast channel quality of locations of the terminal A, the terminal B, the terminal C, and the terminal I, so that it is determined, based on the measurement report A, the measurement report B, the measurement report C, and the measurement report I, whether areas in which the terminal A, the terminal B, the terminal C, and the terminal I are located are weak coverage areas. If broadcast channel quality corresponding to the terminal A, the terminal B, the terminal C, or the terminal I does not meet the condition, the terminal A, the terminal B, the terminal C, or the terminal I is at least one of the first terminals, and a measurement report corresponding to the terminal A, the terminal B, the terminal C, or the terminal I is at least one of the first measurement reports.

203: The access network device determines the weak coverage area of the first broadcast beam based on the first measurement report.

In this embodiment, it may be determined, based on the first measurement report, that the first terminal correspond-ing to the first measurement report is located in the weak coverage area of the first broadcast beam, so that the weak coverage area of the first broadcast beam is determined based on the location of the first terminal. The weak coverage area of the first broadcast beam may be determined based on the location of the first terminal in a plurality of manners. For example, the target cell may be manually divided into a plurality of preset areas, and the access network device may determine a preset area in which the first terminal is located as the weak coverage area. Alternatively, a location of the first terminal may be set as a central location, and an area within a proper range around the central location may be determined as the weak coverage area. A manner of determining the weak coverage area based on the first measurement report is not specifically limited in this embodiment of this application.

204: The access network device sends the second broadcast beam.

In this embodiment, after determining the weak coverage area of the first broadcast beam in the target cell, the access network device sends the second broadcast beam to cover the weak coverage area. There is at least one second broadcast beam. For ease of description, a quantity of second broadcast beams is set to B, and the B second broadcast beams are sent to cover the weak coverage area, thereby improving broadcast channel quality in the weak coverage area, resolving a problem that a user in the weak coverage area cannot access a network, and increasing the user access proportion. B is a positive integer greater than or equal to 1.

Optionally, the second broadcast beam may be obtained through broadening, or may be obtained without broadening. If the second broadcast beam also undergoes the same broadening as that of the first broadcast beam, widths of the second broadcast beam and the first broadcast beam are the same, and a transmit power of the second broadcast beam is the same as the first power. If the second broadcast beam does not undergo the same broadening as that of the first broadcast beam, a width of the second broadcast beam is the same as a width of a broadcast beam in the original coverage solution of the target cell, and a transmit power of the second broadcast beam is less than the first transmit power. This is not specifically limited herein.

In this embodiment, the A first broadcast beams are sent to cover the target cell. The access network device may receive the measurement report reported by the terminal in the target cell, determine the weak coverage area based on the measurement report, and then send the B second broadcast beams to cover the weak coverage area, thereby improving the broadcast channel quality in the weak coverage area, increasing a user access proportion of the target cell, increasing a traffic volume of the target cell, and promoting service development.

The following further describes the broadcast beam processing method according to the foregoing embodiment in detail with reference to a specific case.

Optionally, the first measurement report corresponding to the first terminal may include broadcast channel quality information, and broadcast channel quality indicated by the broadcast channel quality information is less than a first threshold, which indicates that the location of the first terminal corresponding to the broadcast channel quality information is in the weak coverage area of the first broadcast beam. The first threshold may be a preset value, or may be a value selected based on a sorting result after sorting broadcast channel quality indicated by broadcast channel quality information in all measurement reports. For example, sorting is performed in descending order, and a maximum value in the last 5% of broadcast channel quality is used as the first threshold.

Optionally, the first measurement report corresponding to the first terminal may further include data channel quality information, and data channel quality indicated by the data channel quality information is less than a second threshold, which indicates that data channel quality in an area in which the first terminal corresponding to the data channel quality information is located is relatively good. The second threshold may be a preset value, or may be a value selected based on a sorting result after sorting data channel quality indicated by data channel quality information in all measurement reports. For example, sorting is performed in descending order, and a minimum value in the first 50% of the data channel quality is used as the second threshold. Through filtering the data channel quality, the weak coverage area of the first broadcast beam becomes an area in which broadcast channel quality is relatively poor and data channel quality is relatively good. Therefore, after the second broadcast beam is sent for coverage, the traffic volume can be more effectively increased. Otherwise, when data channel quality is poor, the traffic volume cannot be effectively increased even if the broadcast channel quality is improved.

Optionally, the first terminal includes at least one first terminal, the first measurement report includes at least one first measurement report, and the at least one first terminal is in a one-to-one correspondence with the at least one first measurement report. That the access network device determines the weak coverage area of the first broadcast beam based on the first measurement report specifically includes: The access network device determines I weak coverage areas of the first broadcast beam based on the at least one first measurement report, where the I weak coverage areas do not overlap each other, the I weak coverage areas are $C_i$, i is an integer ranging from 0 to I−1, and the I weak coverage areas include a location of the at least one first terminal.

Optionally, the access network device sends, within a time period $t_i$, the second broadcast beam to cover $C_i$, and obtains a terminal increase amount in $C_i$, where the terminal increase amount in $C_i$ may be a difference between a terminal access amount of the second broadcast beam in $C_i$ and a terminal access amount of the first broadcast beam in $C_i$, or may be a difference between a terminal access amount of the second broadcast beam whose broadcast channel quality in $C_i$ is greater than a third threshold and a terminal access amount of the first broadcast beam whose broadcast channel quality in $C_i$ is greater than the third threshold. The third threshold is a preset value used to determine broadcast channel quality, and the broadcast channel quality greater than the third threshold may indicate that the broadcast channel quality is relatively good.

Optionally, when the terminal increase amount in $C_i$ is greater than a fourth threshold, the second broadcast beam is sent in a time period T to cover $C_i$, where a length of the time period T is greater than a length of the time period $t_i$.

Optionally, the broadcast channel quality information may be a broadcast channel signal to interference plus noise ratio (Signal to Interference plus Noise Ratio, SINR), or may be a reference signal received power (reference signal receiving power, RSRP). The measurement report reported by the terminal to the access network device may include the foregoing information. It should be understood that the broadcast channel SINR and the RSRP are only two types of the broadcast channel quality information. In addition, there are other types of the broadcast channel quality information. This is not specifically limited herein.

Optionally, the data channel quality information may be a data channel signal to interference plus noise ratio (Signal to Interference plus Noise Ratio, SINR). It should be understood that the data channel SINR is only one type of the data channel quality information. In addition, there are other types of the data channel quality information. This is not specifically limited herein.

For ease of description, the terminal increase amount in $C_i$ is referred to as an increase amount indicator, the difference between the terminal access amount of the second broadcast beam in $C_i$ and the terminal access amount of the first broadcast beam in $C_i$ is referred to as a first indicator, and the difference between the terminal access amount of the second broadcast beam whose broadcast channel quality in $C_i$ is greater than the third threshold and the terminal access amount of the first broadcast beam whose broadcast channel quality in $C_i$ is greater than the third threshold is referred to as a second indicator below. The following separately describes the two cases.

1. The increase amount indicator is the first indicator.

Figure 3A:
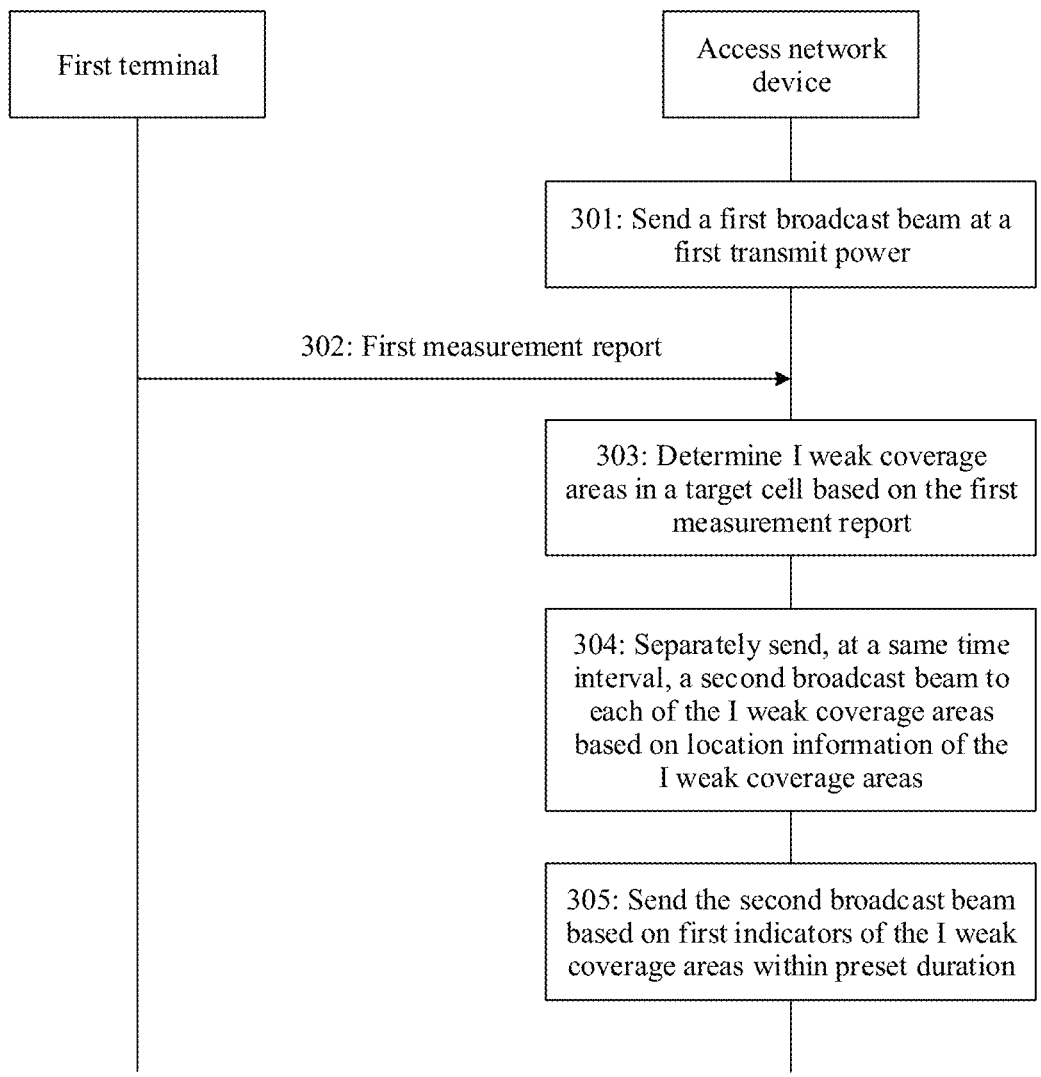
FIG. 3A is a schematic diagram of another embodiment of a broadcast beam processing method according to an embodiment of this application.

FIG. 3A is a schematic diagram of another embodiment of a broadcast beam processing method according to an embodiment of this application.

As shown in FIG. 3A, the another embodiment of the broadcast beam processing method according to this embodiment of this application may include the following steps.

301: An access network device sends a first broadcast beam at a first transmit power.

Optionally, if the first broadcast beam is obtained through broadening, a maximum gain of the first broadcast beam obtained through broadening is reduced compared with an original broadcast beam. Therefore, a transmit power of the first broadcast beam needs to be increased in a power aggregation manner. In other words, the first broadcast beam is sent at the first transmit power, to compensate for a gain loss caused by beam broadening, so that coverage performance is not affected while a coverage scope remains unchanged. For step 301, refer to related descriptions in step 201.

302: The access network device receives a first measurement report from a first terminal in a target cell.

Step 302 is similar to step 202. For detailed descriptions, refer to related descriptions in step 202. Details are not described herein again.

303: The access network device determines I weak coverage areas in the target cell based on the first measurement report.

In this embodiment, based on information carried in the first measurement report obtained by the access network device, the access network device may determine broadcast channel quality in the target cell and determine the I weak coverage areas.

Figure 3B:
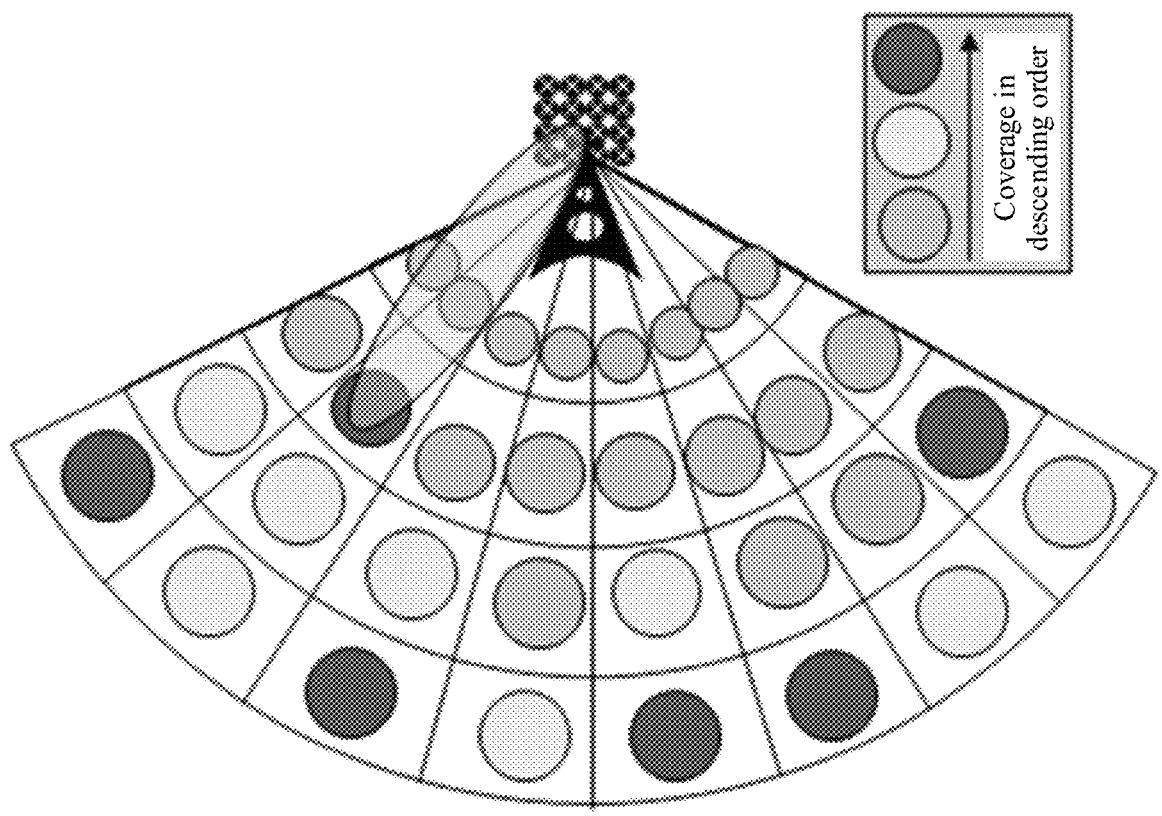
FIG. 3B is a schematic diagram of second broadcast beam coverage according to an embodiment of this application.

For example, as shown in FIG. 3B, a sector area in FIG. 3B is the target cell, the sector area is divided into a plurality of grids, each grid represents an area in the target cell, and six areas with a deepest color in the figure are the weak coverage areas. That is, in this case, I is equal to 6.

304: The access network device separately sends, at a same time interval, a second broadcast beam to each of the I weak coverage areas based on location information of the I weak coverage areas.

In this embodiment, after determining the I weak coverage areas, the access network device may perform broadcast beam coverage on the I weak coverage areas in a polling manner, that is, separately send the second broadcast beam to the I weak coverage areas at the same time interval. The same time interval is a length of the time period $t_i$. The access network device may separately send the second broadcast beam to the I weak coverage areas based on the location information of the I weak coverage areas. The second broadcast beam is used to determine a first indicator when each of the I weak coverage areas is covered by the second broadcast beam. For example, the second broadcast beam separately covers each of the I weak coverage areas for 10 minutes. In this case, it may be determined, based on the first indicator of each weak coverage area covered by the second broadcast beam within the 10 minutes, a weak coverage area whose user access proportion can be better increased when being covered by the second broadcast beam, to determine a weak coverage area in which there is a better effect on increasing the user access proportion.

305: The access network device sends the second broadcast beam based on first indicators of the I weak coverage areas within preset duration.

In this embodiment, after the I weak coverage areas are covered by the second broadcast beam, the second broadcast beam is sent within the preset duration based on the first indicator of each weak coverage area, to cover a weak coverage area that is in the I weak coverage areas and whose first indicator is greater than a fourth threshold. The preset duration is a length of the time period T, and the fourth threshold may be a preset value, or may be a value determined through sorting. For example, the first indicators of the I weak coverage areas are sorted in descending order, and a minimum value in the first B first indicators is used as the fourth threshold. Compared with other weak coverage areas of the I weak coverage areas, that the second broadcast beam is sent to cover the weak coverage area whose first indicator is greater than the fourth threshold can more effectively increase the user access proportion when a second broadcast beam resource is limited.

Optionally, when duration for sending the second broadcast beam by the access network device reaches the preset duration, steps 302 to 304 are repeated, to re-determine the weak coverage area whose first indicator is greater than the fourth threshold, and send the second broadcast beam again to cover the weak coverage area whose first indicator is greater than the fourth threshold. In this way, broadcast channel quality in the weak coverage area is improved and the user access proportion of the target cell is increased.

In this embodiment, because a coverage capability of the second broadcast beam sent by the access network device is limited, the access network device needs to filter the I weak coverage areas that are determined based on the first measurement report. The filtering is performed based on the first indicators, to determine the weak coverage area that needs to be covered by the second broadcast beam. Therefore, a problem that a user in a weak coverage area cannot access a network is preferably resolved within a coverage capability range of the second broadcast beam, to increase the user access proportion to a greatest degree and increase a traffic volume of the target cell.

2. The increase amount indicator is the second indicator.

Figure 4:
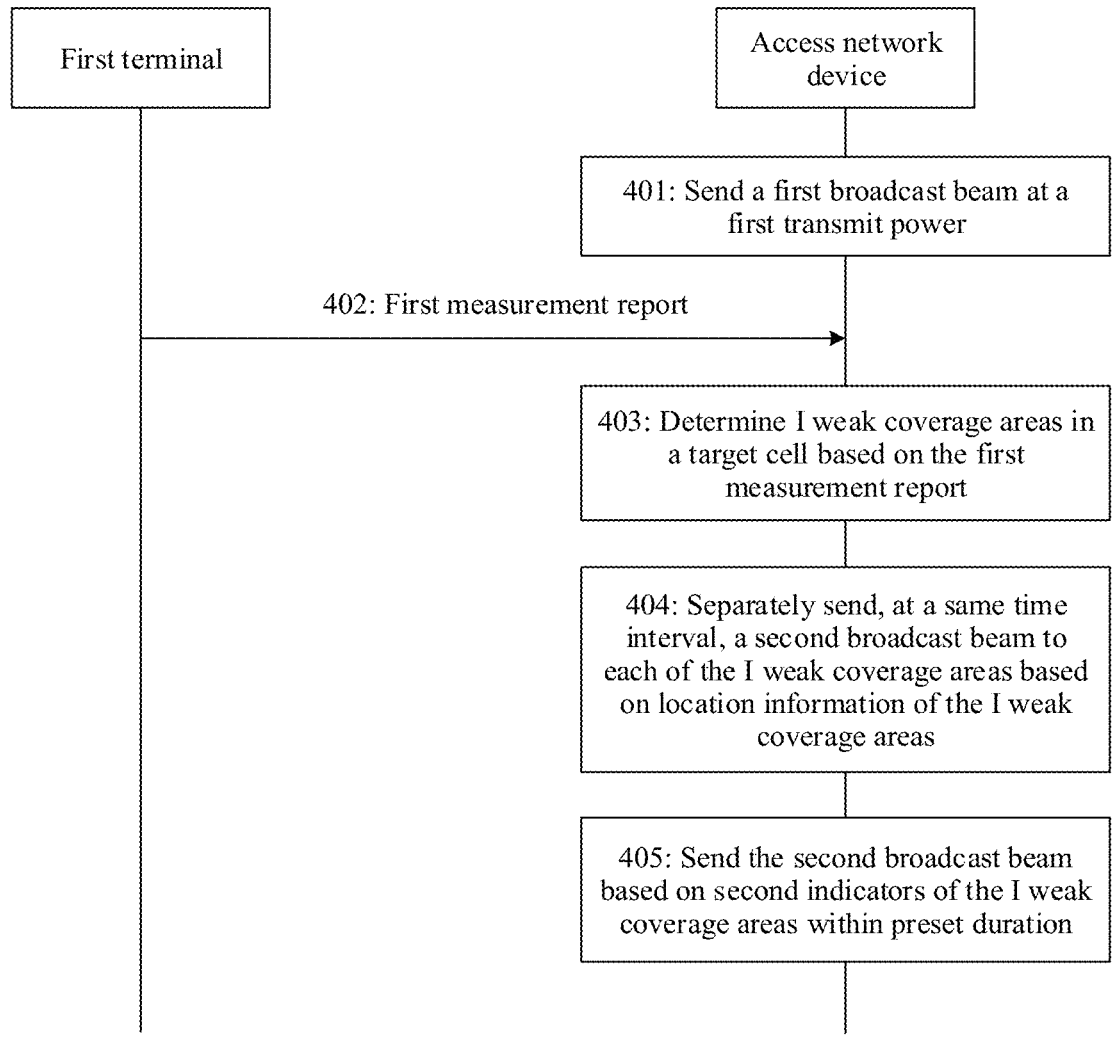
FIG. 4 is a schematic diagram of another embodiment of a broadcast beam processing method according to an embodiment of this application.

FIG. 4 is a schematic diagram of another embodiment of a broadcast beam processing method according to an embodiment of this application.

As shown in FIG. 4, the another embodiment of the broadcast beam processing method according to this embodiment of this application may include the following steps.

401: An access network device sends a first broadcast beam at a first transmit power.

402: The access network device receives a first measurement report from a first terminal in a target cell.

403: The access network device determines I weak coverage areas in the target cell based on the first measurement report.

404: The access network device separately sends, at a same time interval, a second broadcast beam to each of the I weak coverage areas based on location information of the I weak coverage areas.

Steps 401 to 404 are similar to steps 301 to 304. For detailed descriptions, refer to related descriptions in steps 301 to 304. Details are not described herein again.

405: The access network device sends the second broadcast beam based on second indicators of the I weak coverage areas within preset duration.

In this embodiment, after the I weak coverage areas are covered by the second broadcast beam, the second broadcast beam is sent within the preset duration based on the second indicator of each weak coverage area, to cover a weak coverage area that is in the I weak coverage areas and whose second indicator is greater than a fourth threshold. Compared with other weak coverage areas of the I weak coverage areas, that the second broadcast beam is sent to cover the weak coverage area whose second indicator is greater than the fourth threshold can more effectively improve broadcast channel quality in the weak coverage area when a second broadcast beam resource is limited.

In this embodiment, because a coverage capability of the second broadcast beam sent by the access network device is limited, the access network device needs to filter the I weak coverage areas that are determined based on the measurement report. The filtering is performed based on the second indicators, to determine the weak coverage area that needs to be covered by the second broadcast beam. Therefore, a problem that the broadcast channel quality in the weak coverage area is poor is preferably resolved within a coverage capability range of the second broadcast beam, to improve the broadcast channel quality in the weak coverage area to a greatest degree and increase a traffic volume of the target cell.

In a specific embodiment, the first measurement report may include broadcast channel quality information, data channel quality information, and tracking area (tracking area, TA) information. The location information of the weak coverage area may include latitude and longitude information of the weak coverage area, or a horizontal angle and a vertical angle of the weak coverage area relative to the access network device, and information such as an indoor identifier or an outdoor identifier. The following uses a case in which the increase amount indicator is the first indicator as an example, and further description is provided with reference to these specific information.

Figure 5:
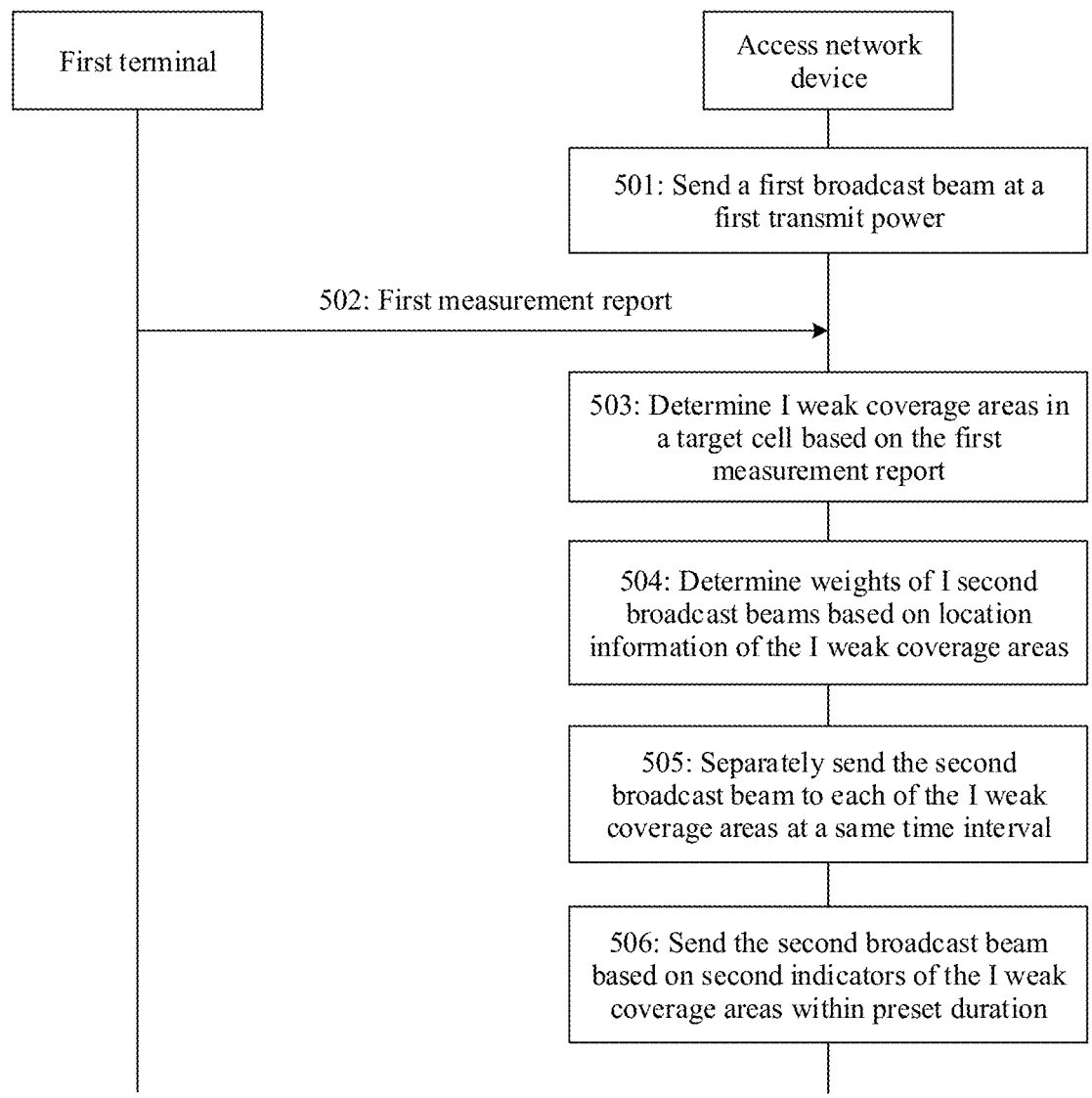
FIG. 5 is a schematic diagram of another embodiment of a broadcast beam processing method according to an embodiment of this application.

FIG. 5 is a schematic diagram of another embodiment of a broadcast beam processing method according to an embodiment of this application.

As shown in FIG. 5, the another embodiment of the broadcast beam processing method according to this embodiment of this application may include the following steps.

501: An access network device sends A first broadcast beams at a first transmit power.

502: The access network device receives a first measurement report from a first terminal in a target cell.

Steps 501 and 502 are similar to steps 301 and 302. For detailed descriptions, refer to related descriptions in steps 301 and 302. Details are not described herein again.

503: The access network device determines I weak coverage areas based on the first measurement report.

In this embodiment, TA information carried in the first measurement report may be used to locate the first terminal corresponding to the first measurement report, and further determine the I weak coverage areas. The I weak coverage areas determined by the access network device are areas in which broadcast channel quality is relatively poor and data channel quality is relatively good. A reason for selecting the I weak coverage areas in which the broadcast channel quality is relatively poor and the data channel quality is relatively good is that the data channel quality is relatively good in these areas, so that a data service can be better promoted while a user access proportion is increased and the broadcast channel quality is improved. However, in areas in which data channel quality is relatively poor, even if a user access proportion is increased and the broadcast channel quality is improved, a data service in these areas cannot be effectively promoted, but a waste of broadcast beam resources is caused.

It should be understood that the first terminal is only a part of all terminals in the target cell, and the first measurement report is also a part of all measurement reports. In a specific embodiment, the measurement report may further carry identification information of the terminal, and the access network device may determine the I weak coverage areas with reference to the identification information of the terminal, broadcast channel quality information, data channel quality information, and the TA information. Specific steps of determining the I weak coverage areas are as follows:

1. The access network device may determine a first identification information set based on broadcast channel quality information carried in all the measurement reports. Broadcast channel quality indicated by broadcast channel quality information corresponding to identification information of each terminal in the first identification information set does not meet a preset quality condition. That is, coverage quality of the first broadcast beams does not meet the preset quality condition. Specifically, the broadcast channel quality information may be an RSRP, or may be a broadcast channel SINR. The RSRP is used as an example for description. The preset condition may be that RSRPs corresponding to the identification information of the terminals are sorted in ascending order to select identification information of top E terminals of the terminals whose RSRPs are sorted in ascending order as the first identification information set. The preset condition may alternatively be that a specific preset RSRP threshold is set to select identification information of E terminals whose RSRPs are less than the preset RSRP threshold as the first identification information set.
2. The access network device may determine a second identification information set based on data channel quality information in all the measurement reports. Data channel quality indicated by data channel quality information corresponding to identification information of each terminal in the second identification information set meets the preset quality condition. Specifically, the data channel quality information may be a data channel SINR. The preset condition may be that data channel SINRs corresponding to the identification information of the terminals are sorted in descending order to select identification information of top F terminals of the terminals whose data channel SINRs are sorted in descending order as the second identification information set. The preset condition may alternatively be that a specific data channel SINR preset threshold is set to select identification information of F terminals whose data channel SINRs are greater than or equal to the data channel SINR preset threshold is selected as the second identification information set.
3. The access network device obtains an intersection between the first identification information set and the second identification information set, to determine G pieces of target identification information, where the G pieces of target identification information are identification information corresponding to the first terminal and the first measurement report.
4. The access network device may determine the location of the first terminal based on TA information corresponding to each of the G pieces of target identification information, and further determine the I weak coverage areas based on the location of the first terminal.

504: The access network device determines weights of I second broadcast beams based on location information of the I weak coverage areas.

In this embodiment, the location information of the I weak coverage areas includes latitude and longitude information of the weak coverage areas, or horizontal angles and vertical angles of the I weak coverage area relative to the access network device, and an indoor identifier or an outdoor identifier. Based on these location information, the access network device may determine the weights of the second broadcast beams. Because a quantity of weak coverage areas is I, a quantity of weights of the second broadcast beams is also I, and the weights are used to correspondingly generate the second broadcast beams.

505: The access network device successively sends the second broadcast beam to each of the I weak coverage areas at a same time interval.

506: The access network device sends B second broadcast beams based on first indicators of the I weak coverage areas within preset duration.

Steps 505 and 506 are similar to steps 304 and 305. For detailed descriptions, refer to related descriptions in steps 304 and 305. Details are not described herein again.

In this embodiment, the access network device may more quickly and effectively determine the I weak coverage areas based on the broadcast channel quality information and the data channel quality information that are carried in the measurement report reported by the terminal. The broadcast channel quality is relatively poor and the data channel quality is relatively good in the I weak coverage areas, which is more suitable for coverage of the second broadcast beam. In this way, both the broadcast channel quality and the data channel quality in the weak coverage areas can meet an actual requirement, and a data service can be better promoted with higher practicability.

The foregoing describes the broadcast beam processing method provided in the embodiments of this application, and the following describes the communications apparatus provided in the embodiments of this application.

Figure 6:
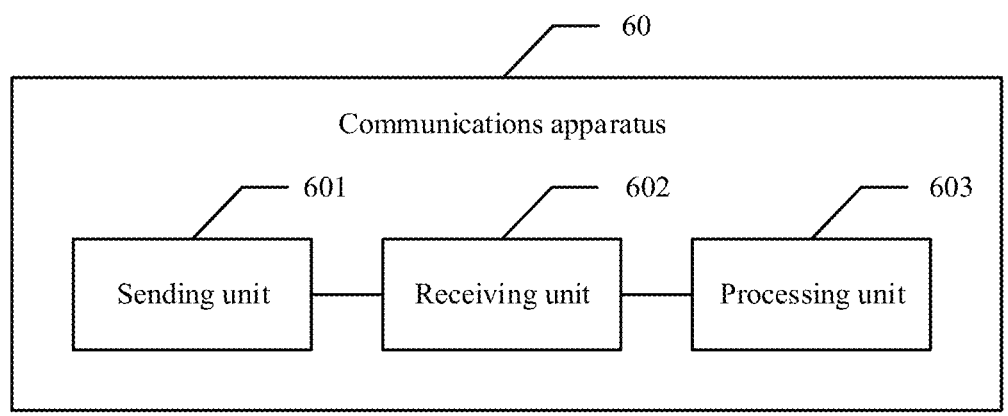
FIG. 6 is a schematic diagram of an embodiment of a communications apparatus according to an embodiment of this application.

FIG. 6 is a schematic diagram of a communications apparatus 60 according to an embodiment of this application. The communications apparatus 60 includes:

a sending unit 601, configured to send a first broadcast beam;

a receiving unit 602, configured to receive a first measurement report from a first terminal; and a processing unit 603, configured to determine a weak coverage area of the first broadcast beam based on the first measurement report.

The sending unit 601 is further configured to send a second broadcast beam, where the second broadcast beam is used to cover the weak coverage area of the first broadcast beam.

In this embodiment of this application, the communications apparatus sends the first broadcast beam for coverage, and sends the second broadcast beam to cover the weak coverage area of the first broadcast beam, thereby improving broadcast channel quality in the weak coverage area and increasing a user access proportion of a target cell.

Optionally, in an embodiment, the measurement report of the first terminal includes broadcast channel quality information, and broadcast channel quality indicated by the broadcast channel quality information is less than a first threshold. The weak coverage area of the first broadcast beam includes a location of the first terminal.

Optionally, in an embodiment, the measurement report of the first terminal includes data channel quality information, and data channel quality indicated by the data channel quality information is greater than a second threshold.

Optionally, in an embodiment, the first terminal includes at least one first terminal, the first measurement report includes at least one first measurement report, and the at least one first terminal is in a one-to-one correspondence with the at least one first measurement report.

The processing unit 603 is configured to determine I weak coverage areas of the first broadcast beam based on the at least one first measurement report, where the I weak coverage areas do not overlap each other, the I weak coverage areas are $C_i$, i is an integer ranging from 0 to I−1, and the I weak coverage areas include a location of the at least one first terminal.

Optionally, in an embodiment, the sending unit 601 is configured to send, within a time period $t_i$, the second broadcast beam to cover $C_i$.

The processing unit 603 is further configured to obtain a terminal increase amount in $C_i$, where the terminal increase amount in $C_i$ includes a difference between a terminal access amount of the second broadcast beam in $C_i$ and a terminal access amount of the first broadcast beam in $C_i$; or the terminal increase amount in $C_i$ includes a difference between a terminal access amount of the second broadcast beam whose broadcast channel quality in $C_i$ is greater than a third threshold and a terminal access amount of the first broadcast beam whose broadcast channel quality in $C_i$ is greater than the third threshold.

The sending unit 601 is configured to: when the terminal increase amount in $C_i$ is greater than a fourth threshold, send the second broadcast beam in a time period T to cover $C_i$, where a length of the time period T is greater than a length of the time period $t_i$.

Figure 7:
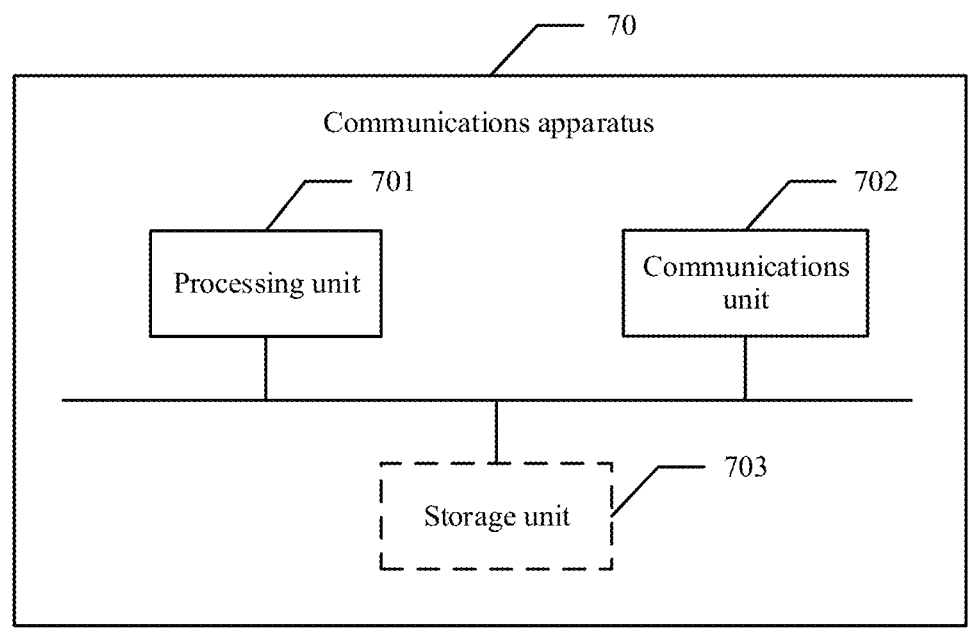
FIG. 7 is a schematic diagram of another embodiment of a communications apparatus according to an embodiment of this application.

The following describes a communications apparatus 70 provided in an embodiment of this application. As shown in FIG. 7, the communications apparatus 70 includes a processing unit 701 and a communications unit 702. Optionally, the communications apparatus 70 further includes a storage unit 703. The processing unit 701, the communications unit 702, and the storage unit 703 are connected by using a communications bus.

The processing unit 701 may be a unit that has a processing function, and may execute an instruction or control or indicate another unit to perform an action.

The communications unit 702 may be a unit that has a transceiver function, and is configured to communicate with another network device or a communications network.

The storage unit 703 may be a unit that is configured for storage. The storage unit 703 may include one or more memories. The memory may be a component configured to store a program or data in one or more devices or circuits.

The storage unit 703 may exist independently, and is connected to the processing unit 701 by using the communications bus. The storage unit 703 may alternatively be integrated together with the processing unit 701.

The communications apparatus 70 may be used in a communications device, a circuit, a hardware component, or a chip.

The communications apparatus 70 may be the access network device in the embodiments of this application. Optionally, the communications unit 702 in the communications apparatus 70 may include an antenna and a transceiver in the access network device. The communications unit 702 may further include a network interface of the access network device.

Alternatively, the communications apparatus 70 may be a chip in the access network device in the embodiments of this application. The communications unit 702 may be an input/output interface, a pin, a circuit, or the like. Optionally, the storage unit 703 may store computer-executable instructions of a method performed by the access network device, so that the processing unit 701 performs the method performed by the access network device in the foregoing embodiments. The storage unit 703 may be a register, a cache, a RAM, or the like, and the storage unit 703 may be integrated together with the processing unit 701. The storage unit 703 may be a ROM or another type of static storage device that can store static information and instructions, and the storage unit 703 may be independent of the processing unit 701. Optionally, with development of wireless communications technologies, the transceiver may be integrated into the communications apparatus 70.

When the communications apparatus 70 is the access network device in the embodiments of this application or the chip in the access network device, the method performed by the access network device in the foregoing embodiments may be implemented. For example, the communications unit 702 may be configured to: send a first broadcast beam and receive a first measurement report from a first terminal. The processing unit 701 may determine a weak coverage area of the first broadcast beam based on the first measurement report. The communications unit 702 may send a second broadcast beam to the weak coverage area of the first broadcast beam. The processing unit may further obtain terminal increase amount data of each weak coverage area under the second broadcast beam. Optionally, when the communications apparatus 70 is the chip in the access network device, that the processing unit 701 sends the first broadcast beam or the second broadcast beam may be understood as that the processing unit 701 sends data of the first broadcast beam or data of the second broadcast beam to a radio frequency unit or an antenna, so that the radio frequency unit or the antenna transmits the first broadcast beam or the second broadcast beam.

An embodiment of this application further provides a computer-readable storage medium. The computer-readable storage medium stores a computer program. When the program is executed by a processor, a procedure related to the communications apparatus in the broadcast beam processing method provided in the foregoing method embodiments may be implemented.

The memory in the embodiments of this application may include at least one of the following types: a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically erasable programmabler-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

In the foregoing embodiments, the method in the embodiments of this application may be performed by one or more modules or units, and the one or more modules or units may be implemented by software, hardware, or a combination thereof.

When any one of the foregoing modules or units is implemented by using software, the software exists in a form of computer program instructions, and is stored in a memory. A processor may be configured to execute the program instructions to implement the foregoing method procedures. The processor may include but is not limited to at least one of the following computing devices that run various types of software: a central processing unit (central processing unit, CPU), a microprocessor, a digital signal processor (DSP), a microcontroller unit (microcontroller unit, MCU), an artificial intelligence processor, or the like. Each computing device may include one or more cores configured to perform an operation or processing by executing software instructions. The processor may be an independent semiconductor chip, or may be integrated into another circuit to form a semiconductor chip. For example, the processor and another circuit (for example, an encoding/decoding circuit, a hardware acceleration circuit, or various bus and interface circuits) may form an SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform the operation or processing by executing the software instructions, the processor may further include a necessary hardware accelerator, for example, a field programmable gate array (field programmable gate array, FPGA), a PLD (programmable logic device), or a logic circuit that implements a dedicated logic operation.

When the foregoing modules or units are implemented by hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, and the hardware may run necessary software or does not depend on software, to perform the foregoing method procedures.

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

A person of ordinary skill in the art may understand that all or some of the steps of the methods in the foregoing embodiments may be implemented by a program instructing related hardware. The program may be stored in a computer-readable storage medium. The storage medium may include a ROM, a RAM, a magnetic disk, an optical disc, or the like.

In the specification, claims, and the accompanying drawings of this application, the terms "first", "second", and the like are intended to distinguish between similar objects but do not necessarily indicate a specific order or sequence. It should be understood that data used in such a way is interchangeable in a proper circumstance, so that the embodiments described herein can be implemented in an order other than the order illustrated or described herein. Moreover, the terms "include", "have" and any other variants mean to cover the non-exclusive inclusion, for example, a process, method, system, product, or device that includes a list of steps or modules is not necessarily limited to those expressly listed steps or modules, but may include other steps or modules not expressly listed or inherent to such a process, method, product, or device. Names or numbers of steps in this application do not mean that steps in a method procedure need to be performed according to a chronological/logical order indicated by the names or numbers. An execution sequence of the steps in the procedure that have been named or numbered may be changed based on technical objectives to be implemented, provided that a same or similar technical effect can be achieved. Division into modules in this application is logical division and there may be another division manner during implementation in actual application. For example, a plurality of modules may be combined or integrated into another system, or some features may be ignored or not performed. In addition, the displayed or discussed mutual couplings, direct couplings, or communication connections may be implemented through some interfaces. Indirect couplings or communication connections between the modules may be implemented in electrical or another form. This is not limited in this application. In addition, modules or sub-modules described as separate components may be or may not be physically separated, or may be or may not be physical modules, or may be distributed into a plurality of circuit modules. Objectives of the solutions of this application may be achieved by selecting some or all of the modules based on an actual requirement.

The broadcast beam processing method and the communications apparatus provided in the embodiments of this application are described in detail above. The principle and implementation of this application are described in this specification through specific examples. The description about the embodiments is merely provided to help understand the method and core ideas of this application. In addition, a person of ordinary skill in the art can make variations and modifications to this application in terms of the specific implementations and application scopes based on the ideas of this application. Therefore, the content of this specification shall not be construed as a limit to this application.

The invention claimed is:

1. A broadcast beam processing method, comprising:
sending a first broadcast beam;
receiving a first measurement report from a first terminal after the first broadcast beam is sent, wherein the first terminal comprises at least one first terminal, the first measurement report comprises at least one first measurement report, and the at least one first terminal is in a one-to-one correspondence with the at least one first measurement report;
determining a weak coverage area of the first broadcast beam based on the first measurement report, wherein determining the weak coverage area of the first broadcast beam based on the first measurement report comprises determining I weak coverage areas of the first broadcast beam based on the at least one first measurement report, wherein the I weak coverage areas do not overlap each other, the I weak coverage areas are $C_i$, i is an integer ranging from 0 to I−1, and the I weak coverage areas comprise a location of the at least one first terminal; and sending a second broadcast beam, wherein the second broadcast beam is used to cover the weak coverage area of the first broadcast beam.

2. The method according to claim 1, wherein the first measurement report of the first terminal comprises broadcast channel quality information, and broadcast channel quality indicated by the broadcast channel quality information is less than a first threshold; and wherein the weak coverage area of the first broadcast beam comprises a location of the first terminal.

3. The method according to claim 2, wherein the first measurement report of the first terminal further comprises data channel quality information, and data channel quality indicated by the data channel quality information is greater than a second threshold.

4. The method according to claim 1, wherein the sending a second broadcast beam comprises sending, within a time period $t_i$, the second broadcast beam to cover $C_i$, and wherein the method further comprises:

obtaining a terminal increase amount in $C_i$, wherein the terminal increase amount in $C_i$ comprises a difference between a terminal access amount of the second broadcast beam in $C_i$ and a terminal access amount of the first broadcast beam in $C_i$, or wherein the terminal increase amount in $C_i$ comprises a difference between a terminal access amount of the second broadcast beam whose broadcast channel quality in $C_i$ is greater than a third threshold and a terminal access amount of the first broadcast beam whose broadcast channel quality in $C_i$ is greater than the third threshold; and when the terminal increase amount in $C_i$ is greater than a fourth threshold, sending the second broadcast beam in a time period T to cover $C_i$, wherein a length of the time period T is greater than a length of the time period $t_i$.

5. A communications apparatus for a base station, comprising at least one processor and a non-transitory memory storage coupled to the at least one processor and storing programming instructions for execution by the at least one processor, wherein the programming instructions instruct the base station to perform operations comprising:

sending a first broadcast beam;

receiving a first measurement report from a first terminal after the first broadcast beam is sent, wherein the first terminal comprises at least one first terminal, the first measurement report comprises at least one first measurement report, and the at least one first terminal is in a one-to-one correspondence with the at least one first measurement report;

determining a weak coverage area of the first broadcast beam based on the first measurement report, wherein determining the weak coverage area of the first broadcast beam based on the first measurement report comprises determining I weak coverage areas of the first broadcast beam based on the at least one first measurement report, wherein the I weak coverage areas do not overlap each other, the I weak coverage areas are $C_i$, i is an integer ranging from 0 to I−1, and the I weak coverage areas comprise a location of the at least one first terminal; and sending a second broadcast beam, wherein the second broadcast beam is used to cover the weak coverage area of the first broadcast beam.

6. The communications apparatus according to claim 5, wherein the first measurement report of the first terminal comprises broadcast channel quality information, and broadcast channel quality indicated by the broadcast channel quality information is less than a first threshold; and wherein the weak coverage area of the first broadcast beam comprises a location of the first terminal.

7. The communications apparatus according to claim 6, wherein the first measurement report of the first terminal comprises data channel quality information, and data channel quality indicated by the data channel quality information is greater than a second threshold.

8. The communications apparatus according to claim 5, wherein the sending a second broadcast beam comprises sending, within a time period $t_i$, the second broadcast beam to cover $C_i$, and wherein the operations further comprise:

obtaining a terminal increase amount in $C_i$, wherein the terminal increase amount in $C_i$ comprises a difference between a terminal access amount of the second broadcast beam in $C_i$ and a terminal access amount of the first broadcast beam in $C_i$; or wherein the terminal increase amount in $C_i$ comprises a difference between a terminal access amount of the second broadcast beam whose broadcast channel quality in $C_i$ is greater than a third threshold and a terminal access amount of the first broadcast beam whose broadcast channel quality in $C_i$ is greater than the third threshold; and sending the second broadcast beam in a time period T to cover $C_i$, when the terminal increase amount in $C_i$ is greater than a fourth threshold, wherein a length of the time period T is greater than a length of the time period $t_i$.

* * * * *